United States Patent [19]

Kiel, deceased et al.

[11] 3,919,150
[45] Nov. 11, 1975

[54] HYDROXY FUNCTIONAL ACRYLIC INK

[75] Inventors: Robert H. Kiel, deceased, late of Weston, Ohio, by Jessie H. Kiel, admistratrix, Weston; William C. Grinonneau, Toledo, Both of Ohio

[73] Assignee: Owens-Illinois, Inc., Toledo, Ohio

[22] Filed: Mar. 20, 1973

[21] Appl. No.: 343,084

Related U.S. Application Data

[60] Division of Ser. No. 92,946, Nov. 25, 1970, Pat. No. 3,729,339, which is a continuation of Ser. No. 693,050, Dec. 13, 1967, abandoned.

[52] U.S. Cl. ...... 260/28.5 R; 117/37 R; 117/124 E; 117/124 F; 117/161 UZ; 117/161 LN; 117/161 ZA; 117/161 ZB; 260/33.2 R; 260/33.2 EP; 260/33.2 SB; 260/33.4 R; 260/33.4 EP; 260/33.4 SB; 260/39 P; 260/39 M; 260/42.21; 260/42.26; 260/826; 260/827; 260/834; 260/836; 260/851

[51] Int. Cl.² .................................. C08L 61/20

[58] Field of Search .......... 260/826, 827, 834, 836, 260/851, 28.5

[56] References Cited
UNITED STATES PATENTS

| | | | |
|---|---|---|---|
| 3,331,885 | 7/1967 | Rider et al. | 260/826 |
| 3,455,877 | 7/1969 | Plueddemann | 260/826 |
| 3,468,836 | 9/1969 | Sekmakas | 260/827 |
| 3,488,310 | 1/1970 | McCombs | 260/826 |
| 3,556,754 | 1/1971 | Marsden et al. | 260/826 |
| 3,644,566 | 2/1972 | Kincheloe et al. | 260/827 |

FOREIGN PATENTS OR APPLICATIONS

| | | | |
|---|---|---|---|
| 4,534,707 | 9/1970 | Japan | 260/826 |

*Primary Examiner*—Wilbert J. Briggs, Sr.
*Attorney, Agent, or Firm*—Donald Keith Wedding

[57] ABSTRACT

This invention relates to the preparation of a novel organic thermosetting resin base decorative composition having increased permanency of adhesion and decorative properties when applied as a film or coating to a glass substrate, said composition consisting essentially of a hydroxyl functional acrylic resin, a thermosetting aminoplast resin, and an ambifunctional, epoxy reactive silane, the acrylic resin being present in an approximate stoichiometric proportion relative to the aminoplast and the silane being present in an amount sufficient to substantially improve the permanency of adhesion of the composition to a glass surface. A further advantage of this invention is that the composition can be conveniently mixed and stored in one container until used.

4 Claims, No Drawings

HYDROXY FUNCTIONAL ACRYLIC INK

RELATED APPLICATIONS

This is a division of copending U.S. Pat. application Ser. No. 92,946, filed Nov. 25, 1970, now U.S. Pat. No. 3729339, which is a continuation of U.S. Pat. application Ser. No. 693,050, filed Dec. 13, 1967, now abandoned.

This INVENTION This invention relates to a novel process and decorative composition whereby a suitable surface, particularly a glass surface such as a glass container, e.g., bottles, ware, tumblers, and the like, is decorated with a composition which has increased permanency of adhesion and decorative properties, particularly increased brightness, opaqueness, hardness, and gloss.

More particularly, in accordance with the practice of this invention, there is provided a novel one-container, organic, thermosetting, resin-based, cross-linked, decorative composition consisting essentially of a hydroxyl functional acrylic resin, a thermosetting aminoplast resin, and a small effective amount of an ambifunctional, epoxy reactive silane.

Coating compositions have been prepared in the prior art utilizing acrylic and amine-aldehyde resins, e.g., as disclosed in U.S. Pat. No. 3,068,183. However, such utilization has often involved polymerizing the acrylic with a third resin such as norbornene (prior to applying the coating to the selected substrate) with the amine-aldehyde being present during such polymerization, e.g., as disclosed in U.S. Pat. Nos. 2,985,611 and 3,196,124. Likewise, similar utilizations have been used in aqueous emulsion systems, e.g., as disclosed in U.S. Pat. No. 3,090,762. Furthermore, such compositions have frequenly involved the use of a catalyst, e.g., as disclosed in U.S. Pat. Nos. 2,931,742; 3,068,183; and 3,305,601. Also such applications have typically involved a carboxyl functional acrylic resin.

The instant invention has distinct advantages over such prior art compositions by utilizing a one-can system which can be applied to a decorable surface, e.g., a glass container surface, and cured while in contact with such surface in the absence of a basic curing catalyst. In one embodiment hereof, the composition is cured at an elevated temperature without browning or degrading thereof. In accordance with this invention, particularly the aforementioned embodiment, a high speed printing technique can be used, e.g., such as offset printing, to apply an organic base composition to a greater number of decorable items per unit time. Such high speed decorating has not been possible with low temperature curing organic compositions; that is, such compositions have not been used where economy is essential, e.g., in the decorating of high production, low cost items such as glassware, bottles, etc. Likewise, this invention has the important advantage of exhibiting increased permanency of adhesion and caustic resistance.

In the practice of this invention, it is contemplated using the hydroxyl functional acrylic resin(s) in an approximate stoichiometric proportion relative to the aminoplast resin(s), e.g., 80 to 120 percent of the theoretical stoichiometric molar ratio.

In the practice of this invention, as will be discussed hereinafter, it is also contemplated that other compatible decorative coating or ink forming ingredients can be present such as fillers, pigments, solvents, wetting or dispersing agents, waxes, etc.

The hydroxyl functional acrylic resin used herein is a copolymer of a hydroxyl bearing monomer having the typical formula

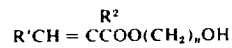

where $R'$ and $R^2$ are the same or different members selected from hydrogen and alkyl radicals of less than eight carbons and $n$ is an integer of 1 to 10, which is copolymerizable by addition polymerization with at least one polymerizable ethylenically unsaturated monomer selected from vinyl aromatic compounds free of substituents capable of reacting with a hydroxyl group and esters of saturated alcohols and unsaturated acids containing one to 20 carbon atoms.

Although the hydroxyl bearing monomer will typically contain the hydroxyl at a terminal position, e.g., such as 2-hydroxyethyl methacrylate or 3-hydroxypropyl methacrylate, it is intended that the aforementioned formula also include monomers where the hydroxyl is not in a terminal position, e.g., such as 1-hydroxyethyl methyacrylate or 2-hydroxypropyl methacrylate.

The aforementioned hydroxyl bearing monomer may be conveniently prepared by the reaction of an acrylic acid having the formula

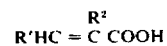

where $R'$ and $R^2$ are the same or different members selected from hydrogen and alkyl radicals of less than eight carbons, with an alkylene oxide or epoxyhydrocarbon of 10 or less carbons, e.g., such as ethylene oxide, propylene oxide, 1,2 epoxybutane, 2,3 epoxybutane, etc. Further examples of such oxides may be found in Canadian Pat. No. 580,619.

Examples of polymerizable ethylenically unsaturated vinyl aromatic compounds include styrene, alpha-methyl styrene, and vinyl toluene.

Examples of polymerizable ethylenically unsaturated esters of saturated alcohols and unsaturated acids include saturated alcohol esters of acrylic and methacrylic acids such as methyl acrylate, ethyl acrylate, butyl acrylate, 2-ethylhexyl acrylate, methyl methacrylate, ethyl methacrylate, butyl methacrylate, hexyl methacrylate, decyl-octyl methacrylate, lauryl methacrylate, and stearyl methacrylate.

Other examples of the aforementioned polymerizable ethylenically unsaturated monomers are disclosed in U.S. Pat. Nos. 2,931,742 and 3,305,601 and U.S. Pat. No. Re. 25,993.

The thermosetting aminoplast resins contemplated herein are prepared by the reaction of an aldehyde, especially formaldehyde, with an amino compound having at least two reactive primary amino groups with the nitrogen of the amino group being adjacent to a carbon atom having a double bond such that tautomerism is possible. The double bonded carbon atom may be contained in an aromatic ring.

Typical amino compounds include urea, the aminotriazines especially melamine, thiourea, aniline, benzene sulfonamide, and toluene sulfonamide. Likewise, dicyandiamide, guanidine (imino urea), and alkyl substituted ureas may be used.

Typical aldehydes include formaldehyde, acetaldehyde, acrolein, and furfural.

Examples of the thermosetting aminoplast resins include the aniline-formaldehyde resins prepared under neutral, weak acid, or strong acid conditions, e.g., as disclosed on page 280, et seq. of the Polymers and Resins text by Dr. B. Golding, D. Van Nostrand Co., Inc., New york, 1959; the aminotriazine(s)-formaldehyde resins as disclosed in U.S. Pat. No. 3,105,826; the melamine-formaldehyde resins, e.g., as disclosed on page 276, et seq. of the aforementioned Polymers and Resins text and U.S. Pat. No. 3,105,826, especially the alkoxyalkyl melamines such as methoxymethyl melamine and the urea-formaldehyde resins as disclosed on page 264, et seq. of the Polymers and Resins text and on page 103, et seq. of Introduction To Polymer Chemistry by John K. Stille, John Wiley and Sons, Inc., New York, 1962.

In one particular embodiment hereof there is used hexamethyoxymethylmelamine prepared by the reaction of melamine with aqueous formaldehyde using a stoichiometric excess of formaldehyde.

In accordance with this invention, there is also used an epoxy reactive, ambifunctional silane in an amount sufficient to increase the permanency of adhesion and the caustic resistance of the decorative composition, especially when the composition is applied to a glass surface, e.g., as a decorative ink.

It has been known in the art that amino containing silanes can be used to increase the permanency of adhesion of decorative coatings for glass. However, many of such amino silanes cannot be added to the coating composition until shortly before the use of the coating since the amine group typically causes the composition to gel within a very short period of time. Accordingly, it has not been possible to use many of the amine functional silanes in various one-can decorating resin based compositions.

However, it has been discovered in the practice of this invention that a one-can formulation is possible with certain epoxy reactive, ambifunctional silanes; that is, the addition of such silanes to the composition of this invention makes it possible to premix such coating composition for a reasonably long period of time prior to use.

Likewise, the permanency of adhesion of the coating composition to the glass surface is substantially enhanced relative to other coatings when soaked in water or hot caustic for prolonged periods of time. Thus, the use of an epoxy reactive ambifunctional silane in accordance with this invention provides a decorative glass coating which typically exhibits permanency of adhesion to a glass surface when soaked in a 3 percent by weight aqueous NaOH solution at 160°F. for a relatively short period of time or when soaked in water at 72°F. for several months. Such permanency of adhesion may be readily tested and observed by applying a layer of adhesive tape to a coated glass surface which has been soaked in NaOH solution or hot water.

In this invention, there is used an epoxy reactive, ambifunctional silane compound having the structural formula:

wherein $R^3$ is selected from divalent hydrocarbon radicals of less than 10 carbon atoms and divalent hydrocargon radicals of less than 10 carbon atoms containing oxygen atoms, at least one oxygen atom being in the form of ether linkages, and wherein $x$ has a value of either 0 or 1, and $R^4$ is selected from the same or different members of the group consisting of hydrogen and aliphatic hydrocarbon radicals of less than five carbon atoms (methyl, ethyl, propyl, and butyl). In order to have a stable epoxy compound, preferably at least two of the $R^4$ groups should be selected from aliphatic hydrocarbon radicals.

In accordance with one preferred embodiment of this invention, the epoxy reactive silane is a glycidoxypropyltrialkoxysilane represented by the structural formula:

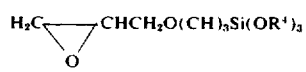

where $R^4$ is selected from hydrogen and an aliphatic hydrocarbon radical of less than five carbon atoms.

The ambifunctional silane is used in an amount sufficient to substantially increase the permanency of adhesion of the coating composition to the particular glass surface, usually a small effective amount of about 1 to 10 parts by weight of silane per 100 parts by weight of the resins.

The pigments or fillers contemplated in the practice of this invention may be colored, colorless, inorganic, or organic.

Generally, the inorganic pigments include alumina hydrate, barium sulfate, chrome green, iron blues, lithopones, vermillion, white lead, and metal oxides such as zirconium oxide, titanium dioxide, zinc oxide and the like.

When the pigment is a metal oxide, it is especially desirable if it is prepared by a vapor phase decomposition technique, such as the vapor phase decomposition of a titanium halide in the presence of an oxidizing or hydrolyzing agent to produce titanium oxide. If titanium oxide is used as the pigment, it is preferred to use the rutile form as distinguished from the anatase.

Organic pigments that are satisfactory for the instant coating may be chemically classified as the nitro, the azo and diazo, the nitroso and isonitroso, the oxyketone, the ketonimides and hydrazides, the azines, the quinolines, the acridine, the indanthrene and the phthalocyanine colors. Examples of organic pigments include anthosine, benzidine yellow, eosine, rose bengal, Hanse yellow, lithol red, methyl red, and peacock blue.

Although the concentration of the pigment(s) will, of course, be dependent on the color desired and the nature of the pigment, typically the pigment(s) is present in a concentration range of about 5 to 75 percent by weight.

Likewise, known low temperature catalysts such as certain of the carbonates may be used as pigments or fillers herein even though such are not intended nor required for the curing of the composition. However, if certain catalysts such as the triphenylamines are used as organic pigment, such may cause gelation and thereby prevent the use of a one-container formulation.

Suitable solvents which can be used in the ink formulations include methylethyl ketone, methyl isobutyl ketone, diacetone alcohol, acetone, ethyl acetate, n-butyl acetate, ethylene glycol monoethyl ether, ethylene glycol monomethyl ether, ethylene glycol monobutyl ether, diethylene glycol monoethyl ether, ethylene glycol monoethyl ether acetate, toluene, zylene, benzene trichloropropane, chloroform, isophorone, alkyl cellosolve such as butyl cellosolve including solvent mixtures such as mixtures of tolueneisopropyl alcohol, mixtures of toluene-sec butyl alcohol, mixtures of toluene with 4-methyl-2-pentanal and the like.

In a preferred embodiment of this invention, the solvent is non-aromatic and is an aliphatic or heterocyclic solvent, e.g., butyl cellosolve.

Suitable wetting and/or dispersing agents contemplated herein include lecithins, mixed fatty acid esters of phosphatidyl choline, polyethylene sorbital oleate eaurate, sodium oetylsulfate, polyethylene glycol lauryl ether, and diethylene glycol monostearate.

In the practice of this invention, the addition of wax(es) to the decorative composition has various beneficial results. Thus, for example, the addition of a dispersed polyethylene wax will substantially increase the carton abrasion resistance of the composition when applied to a glass surface e.g., a glass container surface.

In accordance with one embodiment of this invention, the novel compositions are typically applied to a suitable surface such as a glass substrate and quickly cured at elevated temperatures without degrading the organic resins. Thus, in the practice of such embodiment, the novel resin-base compositons hereof can be heated and cured at temperatures of about 2,000°F. within only a few seconds, e.g., about 350°F. to about 2,000°F. for about 20 minutes to about 5 seconds.

In such embodiment the compositions hereof are typically cured at about 375°F. to about 1,000°F. for about 10 minutes to about 1 minute.

The hereinafter examples represent some of the best modes contemplated by the inventors in the practice of this invention.

EXAMPLE I

A hydoxyl containing acrylic resin is prepared by adding 105.8 grams of methyl methacrylate, 142.1 grams of 2-ethylhexyl acrylate, 43.0 grams of 2-hydroxyethyl methacrylate, and 6.0 grams of cumene hydroperoxide to a one liter kettle containing 300.0 grams of cellosolve acetate, the kettle and solvent having previously been purged with nitrogen for 15 minutes.

The mixture is heated to about 150°C. and maintained at the temperature for a period of time sufficient to complete the reaction, e.g., about 6 to 8 hours.

The hydroxyl containing acrylic resin recovered from the reaction has a solids content of about 51 percent by weight, a hydroxyl number of 34.5, and an average molecular weight of about 18,000.

EXAMPLE II

A composition consisting of 85.0 parts by weight of the acrylic resin prepared in EXAMPLE I, 15.0 parts by weight hexamethoxymethylmelamine, 100.0 by weight rutile TiO₂, and 4.0 parts by weight glycidoxypropyltrimethoxysilane is prepared and 2.0 parts by weight of polyethylene wax(es) dispersed therein. The resulting composition is then milled on a three roll mill.

A portion of the composition is applied as a coating to two identical soda lime glass substrates and cured by baking in a forced air oven at 400°F. for 10 minutes.

One of the specimens is soaked in water at 75°F. and the other is soaked in 3% by weight NaOH at 160°F.

Periodically the specimens are recovered from the water and NaOH baths and tested by means of an adhesive tape applied to the coated glass surface.

After two months of continuous water soaking, the water soaked coating still adheres pemanently to its respective glass surface with no detectable amount being noted on the applied adhesive tape.

The film tested in NaOH exhibits good caustic resistance by adhering permanently to its respective glass substrate after soaking in a 3% NaOH solution at 160°F. for 30 minutes.

Each film exhibits increased brightness, opaqueness, and gloss relative to comparable prior art compositions.

EXAMPLE III

EXAMPLE II is repeated using ACRYLOID AT-50 instead of the acrylic resin prepared in EXAMPLE I. The results obtained in EXAMPLE II are again observed.

ACRYLOID is a registered trademerk identifying thermosetting acrylic resins (both hydroxyl-functional and carboxyl-functional types available from the Rohm and Haas Company, Philadelphia, Pennsylvania, 19105. Physical and chemical characteristics and properties are given in Rohm and Haas Technical Bulletin C-170-65, published October, 1965.

ACRYLOID AT-50 as used in EXAMPLE III is a hydroxy-functional type thermosetting acrylic resin having a viscosity of 625-1755 centipoises at 25°C., a color of 50 max. (ASTM D1544-58T), and a weight per gallon of 8.4 pounds.

Although the invention has been illustrated and described hereinbefore with reference to certain specific details and embodiments, it will be readily apparent to those skilled in the art that other embodiments and modifications hereof can be made within the scope and spirit of the invention.

We claim:

1. As a composition of matter, a thermosetting, organic resin based glass decorating composition exhibiting increased brightness, opaqueness, hardness and gloss, and capable of being cured at high elevated temperatures up to 2000°F. without browning or degrading thereof, said composition consisting essentially of an acrylic resin containing reactive hydroxyl groups which is a copolymer of a hydroxyl bearing monomer having the formula:

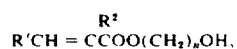

where R' and R² are the same or different members selected from hydrogen and alkyl radicals of less than eight carbons and n is an integer of 1 to 10, which is copolymerizable by addition polymerization with at least one polymerizable ethylenically unsaturated monomer selected from vinyl aromatic compounds free of substituents capable of reacting with a hydroxyl group and esters of saturated alcohols and unsaturated acids containing one to 20 carbon atoms,
a thermosetting aminoplast resin containing reactive hydrogen atoms, and
an ambifunctional, epoxy reactive silane having the structural formula:

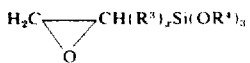

wherein $R^3$ is selected from divalent hydrocarbon radicals of less than 10 carbon atoms and divalent hydrocarbon radicals of less than 10 carbon atoms containing at least one oxygen atom being in the form of an ether linkage, and wherein $x$ has a value of either 0 or 1, and $R^4$ is selected from the same or different members of the group consisting of hydrogen and aliphatic hydrocarbon radicals of less than five carbon atoms,
the epoxy reactive silane being present in an amount sufficient to substantially improve the permanency of adhesion of the composition to the glass when subjected to a 3 percent by weight caustic solution at 160°F. for at least 20 minutes, and the proportion of the acrylic resin being 80 to 120 percent of the stoichiometric molar ratio of the acrylic resin to the aminoplast resin, said stoichiometric molar ration being determined by the reaction of all of the reactive hydroxyl groups of the acrylic resin with all of the reactive hydrogen atoms of the aminoplast resin.

2. The composition of claim 1 wherein the silane is a glycidoxypropyltrialkoxysilane.

3. The composition of claim 2 wherein the thermosetting aminoplast resin is prepared by the reaction of an aldehyde with an amino compound having at least two reactive primary amino groups with the nitrogen of the amino group being adjacent to a carbon atom having a double bond.

4. The composition of claim 3 wherein compatible ingredients selected from pigments, fillers, volents, wetting or dispersing agents, and polyethylene wax are added to the composition prior to the thermally curing of the composition.

* * * * *